United States Patent [19]
Diez et al.

[11] Patent Number: 5,863,046
[45] Date of Patent: Jan. 26, 1999

[54] CYLINDER HEAD GASKET WITH DEFORMABLE DEFORMATION LIMITER

[75] Inventors: Armin Diez, Lenningen; Ulrich Werz, Dettingen; Eberhard Griesinger, Bad Urach, all of Germany

[73] Assignee: Elring Klinger GmbH, Dettingen, Germany

[21] Appl. No.: 800,105

[22] Filed: Feb. 13, 1997

[30] Foreign Application Priority Data

Feb. 17, 1996 [DE] Germany .................. 196 05 871.6

[51] Int. Cl.⁶ ............................................. F02F 11/00
[52] U.S. Cl. ............................................. 277/593; 277/595
[58] Field of Search ............................... 277/591, 593, 277/594, 595, 596

[56] References Cited

U.S. PATENT DOCUMENTS

| | | | |
|---|---|---|---|
| 4,836,562 | 6/1989 | Yoshino | 277/595 |
| 5,205,566 | 4/1993 | Ueta et al. | 277/596 |
| 5,286,039 | 2/1994 | Kawaguchi et al. | 277/593 |
| 5,601,292 | 2/1997 | Tanaka et al. | 277/595 X |
| 5,609,345 | 3/1997 | Miura et al. | 277/593 |
| 5,695,200 | 12/1997 | Diez et al. | 277/593 |

*Primary Examiner*—Anthony Knight
*Assistant Examiner*—Greg Binda
*Attorney, Agent, or Firm*—Alix, Yale & Ristas, LLP

[57] ABSTRACT

A metallic cylinder head gasket for an internal combustion engine comprises a carrier plate sandwiched between flat cover plates, the multi-layer structure having a pattern of openings as dictated by the arrangement of engine cylinders, head mounting bolts and fluid flow passages. Resilient beads which cooperate with the carrier plate to form ring seals are formed in the cover plates and are arranged coaxially with respect to the apertures in the gasket. The beads are offset radially outwardly from the edges of the apertures and a deformation limiter is provided between each bead and the edge of the coaxial aperture, the deformation limiters being in the form of either a pair of oppositely directed, generally trapezoidal shaped deformable beads in the support plate or a single such trapezoidal shaped bead and a cooperating ring member which covers the concave side of the bead.

20 Claims, 1 Drawing Sheet

CYLINDER HEAD GASKET WITH DEFORMABLE DEFORMATION LIMITER

BACKGROUND OF THE INVENTION (1) Field of the Invention

The present invention relates to gaskets for providing a seal between machine parts and, particularly, to an improved head gasket for use between the block and cylinder head of an internal combustion engine. More specifically, this invention is directed to a novel metallic cylinder head gasket and, especially, to a multi-layer gasket having at least a first cover plate which includes a resilient primary seal defining bead and a cooperating support plate which includes a deformable structure for limiting deformation of the bead. Accordingly, the general objects of the present invention are to provide novel and improved articles of such character.

(2) Description of the Prior Art

Published European Patent No. EP 0 306 766 and U.S. Pat. Nos. 4,726,315 and 4,799,695 disclose prior art metallic cylinder head gaskets for use in the environment of an internal combustion engine. These prior art cylinder head gaskets comprise a support or carrier plate which cooperates with at least one cover plate, the cover plate having resilient beads, i.e., smoothly curved deformations, which function as sealing rings. As is well known, during the operation of an internal combustion engine, the width of the gap between the cylinder head and engine block, particularly in the regions adjacent the cylinders, varies because the operating environment is characterized by high temperature and by periodic pressure fluctuations. The cylinder head gasket, which must seal this variable gap, is thus subject to continuous changes in pressure and must have permanent resilient properties in order to maintain a satisfactory seal.

In prior art cylinder head gaskets as exemplified by the above referenced publications, a multiplicity of ring-type seals are defined by upward longitudinal extensions of the gasket, such gasket extensions defining, and thus being disposed about, extensions of the combustion chambers. These gasket extension are in the form of "beads", i.e., curved projections which seal on their convex side. The beads function as resilient seals which flex to follow vertical movements of the cylinder head relative to the engine block. For such gaskets to perform properly, the resilient beads must be prevented from undergoing unacceptably large deformation under maximum loading. Overloading of a bead may cause a rupture or permanent deformation which would deleteriously affect the sealing properties. On the other hand, the construction of the gasket must be such that the applied clamping force will not be completely relieved, i.e., the beads will remain subject to some deformation under the condition of minimum loading. The working range of the resilient beads thus lies between two extremes of deformation.

To summarize the above, in order to ensure proper functioning, the resilient beads of a metallic cylinder head gasket must not be completely deformed either during installation of the gasket, i.e., bolting of the head to the block, or under operating conditions. An unacceptably large vertical deformation of a bead, i.e., a compression which will cause damage, in respect to the nominal plane of the gasket is, in known gaskets, prevented by means of a "deformation limiter" of constant thickness. Such deformation limiters are customarily provided about the periphery of the combustion chamber extensions defined by the gasket and serve to extend the gasket upwardly about the periphery of the combustion space.

Metallic cylinder head gaskets which have previously been available have been found to be somewhat lacking in performance in the environment of recently introduced high power engines of weight-saving design. The deficiencies of prior art cylinder head gaskets in the environment of these new engines may be attributed to the different degrees of rigidity of the engine components. These different degrees in rigidity have resulted in the forces in the regions adjacent the periphery of the combustion chambers differing significantly from those in the regions adjacent to the points where the cylinder head is bolted to the engine block. Restated, a high mechanical clamping force is exerted on the cylinder head gasket in the areas near the bolts which attach the cylinder head to the engine block, this force decreasing with increasing distance from the bolts. Accordingly, a relatively small degree of further deformation will result in the sealing beads which surround the head bolts deforming from an initial clamped condition to the condition of maximum allowable deformation as determined by a cooperating deformation limiter. However, in areas displaced from the bolts, where there are smaller stress forces, the beads can experience greater movement between their conditions of minimum and maximum deformation during engine operation, the minimum deformation being characterized by a comparatively small degree of flexure.

As a consequence of the relatively small size of the surface areas where the deformation limiters contact the cover plates, a high degree of loading may cause a depression or indentation to be formed in the cylinder head, such indentation being a mirror image of the deformation limiter. When this happens, the working range of the bead is altered and, consequently, the maximum allowable deformation of the bead may be exceeded. Should this occur, there may be fracture of the gasket cover plate in the bead area.

It should be noted that the above-briefly discussed problem is exacerbated if the engine uses materials with different coefficients of thermal expansion, a gray cast engine block in combination with a light weight alloy head for example. The use of such materials with different coefficients of thermal expansion will result in the bead additionally being stressed in the direction of the plane of the gasket.

SUMMARY OF THE INVENTION

The present invention overcomes the above-briefly discussed and other deficiencies and disadvantages of the prior art by providing a novel and improved metallic cylinder head gasket wherein the maximum acceptable deformation of the sealing beads is not exceeded even during a long service life. In accordance with the invention, the deformation limiter of a metallic gasket, i.e., the upwardly extended portion of the gasket carrier plate, includes a generally trapezoidal shaped, deformable bead. These beads are located adjacent to the edges of the carrier plate which form the extensions of the apertures therein, the apertures which are in registration with the combustion chambers of the engine for example. These trapezoidal shaped beads are disposed inwardly, with respect to the edges of the apertures, from the beads in the cover plate(s) which define primary seals extending about the apertures. Each of these generally trapezoidal shaped carrier plate beads is backed by a component which functions to limit the deformation of the adjacent cover plate bead. In preferred embodiments, these components are either a ring member, which covers the concave side of the bead, or an additional cover plate, which is mirror-symmetrical, i.e., has a generally trapezoidal shaped bead which extends in the opposite direction. Depending on the operating environment, the material from which the carrier plate is formed will be selected so that the deformation limiter trapezoidal bead will be either elastically or plasticly deformable. In either case, the gasket construction results in equalizing the pressure distribution over the periphery of the combustion space.

As a consequence of use of the present invention, and particularly the above-mentioned equalization of the pressure distribution, the pressure in the area of the cylinder head bolts is limited to a maximum design value, and the areas of the gasket intermediate the cylinder head screws are subjected to a comparatively low pressure drop. The foregoing is precipitated by providing the elastically or plastically deformable trapezoidal beads which, when the cylinder head gasket is mounted, are partially deformed in the areas around the cylinder head bolts, this degree of deformation not varying significantly when the maximum design pressure value is reached. The clamping force, and thus the partial deformation of the trapezoidal beads, decreases with increasing distance from the bolts. The cylinder head gasket thus adjusts automatically to the rigidity and force conditions and, additionally, reduces the risk of the deformation limiter causing an indentation in the cylinder head in the areas of high component rigidity. In the areas of lower rigidity, i.e., the areas displaced from the cylinder head bolts, a comparatively large amount of deformation of the components which clamp the cylinder head gasket occurs, resulting in increased pressure. To summarize, the trapezoidal beads equalize the pressure along the rim of the cylinders and thus eliminate the above-discussed problems of the prior art, particularly the exceeding of the deformation limits of the conventional beads. The trapezoidal beads limit the pressure on the cover plate beads which surround the bolt holes.

The invention has the added advantage that it reduces friction induced gasket wear incident to engine vibrations. Thus, with a comparable coefficient of friction, the horizontal dynamics of the cylinder head gasket are reduced by the higher pressure.

BRIEF DESCRIPTION OF THE DRAWING

The present invention may be better understood, and its numerous objects and advantages will become apparent to those skilled in the art, by reference to the accompanying drawing in which like reference numerals refer to like elements in the Figures and in which.

DESCRIPTION OF THE DISCLOSED EMBODIMENTS

Figure 1:
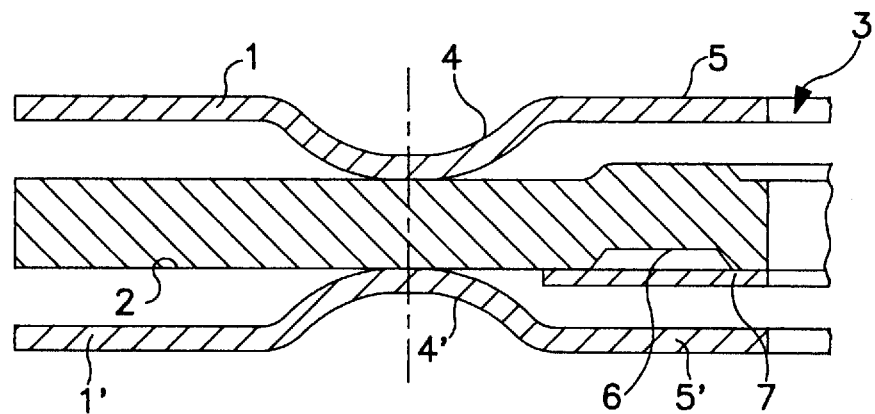
FIG. 1 is a partial, cross-sectional, side-elevation view of a first embodiment of a metallic cylinder head gasket in accordance with the present invention.

Referring to FIG. 1, the disclosed multi-layer cylinder head gasket comprises a carrier or support plate 2 sandwiched between a head side cover plate 1 and a block side cover plate 1'. The gasket will, of course, be provided with a pattern of apertures, such as the opening indicated partly and generally at 3, which correspond to the combustion chambers, attachment bolts, and coolant and oil flow passages of the internal combustion engine with which the gasket is to be used.

The cover plates 1 are conventionally manufactured from planar sheets of spring steel. Each of the cover plates is provided with dome-shaped beads 4 which, with the gasket clamped between the head and block of an engine, cooperate with the support plate 2 to define peripheral seals about each of the openings 3. Each of the cover plates 1 has an annular-shaped, straight plate section 5 which extends between each bead 4 and the edge of the adjacent opening 3. As shown in the drawing, the beads 4 and 4', respectively on plates 1 and 1', are oppositely directed, i.e., each bead is directed inwardly so as to contact the support plate 2 and the beads on the head side and block side cover plates are in registration.

The support plate 2, which is otherwise planar and thus generally parallel to the planes of the cover plates 1, is provided with a generally trapezoidal shaped bead 6. The generally trapezoidal shaped beads 6 are located adjacent to the edge of openings 3, extend around the openings and are disposed radially inwardly with respect to the openings 3 from associated beads 4 which define the primary seals about the openings 3. Restated, relative to the axis of an opening 3, and measured in the plane of the gasket, the maximum radius of each trapezoidal bead 6 is less than the minimum radius of the adjacent bead 4.

The trapezoidal beads 6 may be either elastically or plastically deformable depending on the intended use environment. Thus, if beads 6 are to be elastically deformable, support plate 2 will be fabricated from, for example, spring steel. If beads 6 are to be plastically deformable, the support plate 2 may, again by way of example, be fabricated from St2 steel or the like.

As should be obvious, both the height and/or width of the trapezoidal beads 6 can be varied to suit the intended operating environment.

In the FIG. 1 embodiment, the gasket further comprises an annular, flat metal ring member 7. The ring member 7 is sized and shaped to cover the concave side of the trapezoidal bead 6. Also, the maximum radius of the annular member 7 is less than the minimum radius of the adjacent bead 4. Accordingly, ring member 7 is in registration solely with, and can only contact, the straight plate section 5' of the facing cover plate 1'. The thickness of the ring member 7 is expediently equal to the height of the projection of trapezoidal bead 6 above the planar surface of the side of the support plate 2 located oppositely with respect to the side in contact with ring member 7. Accordingly, the deformation limiter will in effect be symmetrical with respect to a plane disposed midway between the planes defined by the cover plates 1 and 1'.

In the interest of facilitating installation of the multi-layer gasket, the ring member 7 is advantageously attached to the support plate 2. This attachment may be by means of spot welds, adhesive bonding or any other suitable joining technique.

To summarize, in the embodiment of FIG. 1, the deformation limiter for protecting the beads 4 from excessive deformation comprises the trapezoidal shaped bead 6 in the support plate 2 and the cooperating ring member 7 which covers bead 6 on its concave side.

A gasket could be constructed following the teachings of the present invention so as to employ only a single cover plate, i.e., a two layer construction as opposed to the three layer arrangement which has been discussed above.

Figure 2:
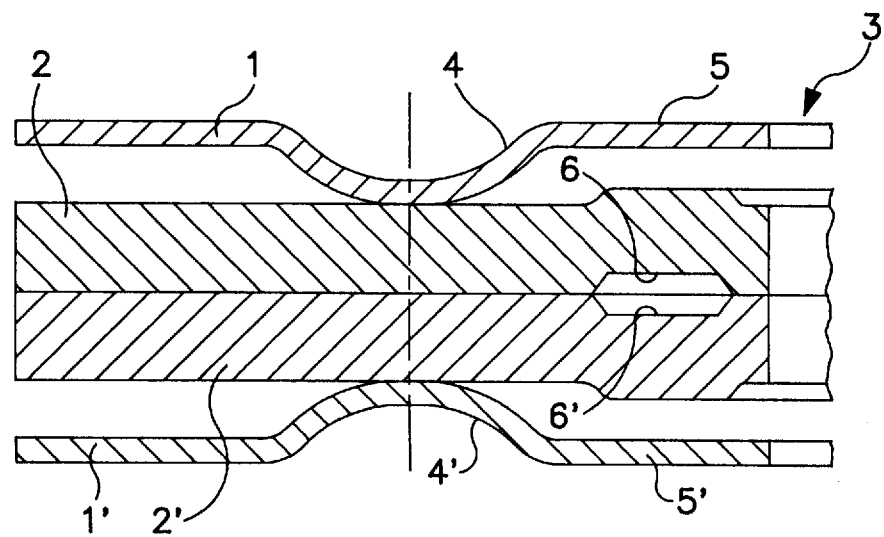
FIG. 2 is a view similar to FIG. 1 depicting a second embodiment of the invention.

In the embodiment of the invention illustrated in FIG. 2, the gasket includes a pair of parallel support plates 2, 2' which are mirror images of one another. Thus, in the FIG. 2 embodiment, the support plate structure is defined by individual support plates 2 and 2' each of which is provided with a generally trapezoidal shaped bead 6, the beads 6 and 6' being in registration and facing in opposite directions. The gasket of FIG. 2 has particular utility in sealing gaps between a cylinder head and engine block which are greater in width than those with which FIG. 1 embodiment would normally be employed. As in the FIG. 1 embodiment, the beads 6 of the FIG. 2 embodiment may be designed to be either plastically or elastically deformable and, of course, the beads may be varied in height and/or width in the peripheral direction. Also, if appropriate, an additional plate may be sandwiched between the support plates 2 and 2'.

In use of the present invention, the surfaces of the cover plate(s) 1 and, if appropriate, the support plate(s) 2 and the rings 7, will typically be provided with a thin elastomer coating. The thickness of this coating will correspond approximately to the roughness of the surfaces of the components to be clamped. The presence of the coating will ensure that a microseal is formed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A metallic cylinder head gasket for use between the engine block and cylinder head of an internal combustion engine, the engine having at least a first combustion chamber which defines an axis, said gasket comprising:

at least a first cover plate, said cover plate having a pair of oppositely disposed planar surfaces, said cover plate being provided with at least a first passage therethrough, said passage being commensurate in cross-sectional area and shape with the combustion chamber of an internal combustion engine, said cover plate being further provided with a bead extending around and offset from said passage, a planar plate section extending between said passage and the surrounding bead, said bead extending outwardly from a first of said planar surfaces of said plate to define a convex resilient projection;

a carrier plate, said carrier plate having a pair of oppositely disposed planar surfaces which are oriented generally parallel to said cover plate planar surfaces, a first surface of said carrier plate cooperating with said resilient bead to define a seal which is coaxial with said passage; and bead deformation limiting means, said deformation limiting means being coaxial with said bead and cooperating with said cover plate planar section, said deformation limiting means comprising:

means defining a first generally trapezoidal shaped bead which extends from the plane defined by said first carrier plate surface in the direction of said first surface of said planar section of said cover plate, said generally trapezoidal shaped bead being deformable; and means cooperating with said first generally trapezoidal shaped bead to increase the thickness of said carrier plate in the region of said first trapezoidal bead, said thickness increasing means being in registration with and covering the concave side of said first trapezoidal bead.

2. The gasket of claim 1 wherein said generally trapezoidal shaped bead defining means is integral with said carrier plate.

3. The gasket of claim 2 wherein said thickness increasing means comprises a flat ring shaped member attached to the second of said carrier plate planar surfaces.

4. The gasket of claim 3 wherein said first trapezoidal bead is elastically deformable.

5. The gasket of claim 3 wherein said first trapezoidal bead is plastically deformable.

6. The gasket of claim 2 wherein said thickness increasing means comprises means defining a second generally trapezoidal shaped bead, said second trapezoidal bead being substantially identical in size with said first trapezoidal bead and extending from said carrier plate in the opposite direction when compared to said first trapezoidal bead.

7. The gasket of claim 6 wherein said first and second trapezoidal beads are elastically deformable.

8. The gasket of claim 6 wherein said first and second trapezoidal beads are plastically deformable.

9. A metallic cylinder head gasket for use between the engine block and cylinder head of an internal combustion engine, the engine having at least a first combustion chamber which defines an axis, said gasket comprising:

a pair of cover plates, each of said cover plates defining a plane, said cover plates each being provided with at least a first passage therethrough, said cover plate passages being aligned and being commensurate in cross-sectional area and shape with the combustion chamber of an internal combustion engine, said cover plates each being further provided with a resilient bead extending around and offset from said first passage, a planar plate section extending between said first passage and the surrounding bead of each of said cover plates, said beads extending outwardly from respective of said cover plates in opposite directions whereby the bead on each of said cover plates constitutes a convex resilient projection extending toward the other of said cover plates;

means defining a carrier plate disposed between said cover plates and cooperating with said cover plate resilient beads to form a pair of ring seals which are generally coaxial with said combustion chamber, said carrier plate defining means having a pair of oppositely disposed cover plate bead contacting surfaces which are planar and generally parallel to said cover plate defined planes, said carrier plate defining means being provided with at least a first passage which is aligned with said cover plate first passages, said carrier plate defining means further including a generally annular shaped upward extension which is arranged coaxially with respect to said cover plate beads, said upward extension including a first generally trapezoidal shaped deformable bead located adjacent to said aligned first passages, said first trapezoidal bead being in registration with and extending from a first of said carrier plate defining means surfaces toward the planar plate section of a first of said cover plates, said upward extension further comprising means cooperating with said first generally trapezoidal shaped bead to limit the deformation of the resilient bead of the second of said cover plates, said deformation limiting means covering the concave side of said first generally trapezoidal shaped bead.

10. The gasket of claim 9 wherein said means cooperating with said first trapezoidal bead to limit deformation comprises a ring-shaped member supported on and extending from said second carrier plate defining means surface.

11. The gasket of claim 10 wherein said first trapezoidal bead is elastically deformable.

12. The gasket of claim 10 wherein said first trapezoidal bead is plastically deformable.

13. The gasket of claim 10 wherein said ring-shaped member is flat and has a thickness which is substantially equal to the undeformed extension of said first trapezoidal bead beyond the plane of the surface of said carrier plate defining means.

14. The gasket of claim 9 wherein said means cooperating with said first trapezoidal bead to limit deformation comprises a second generally trapezoidal shaped bead, said second trapezoidal bead being in registration with said first trapezoidal bead and extending toward the planar plate section of said second cover plate.

15. The gasket of claim 14 wherein said first and second trapezoidal beads are elastically deformable.

16. The gasket of claim 14 wherein said first and second trapezoidal beads are plastically deformable.

17. The gasket of claim 14 wherein said carrier plate defining means is of multi-layer construction and said first and second generally trapezoidal shaped beads are formed in respective of said layers.

18. The gasket of claim 9 wherein said first passages have a first diameter, said cover plate beads occupy an annular area of said cover plates in a direction transverse to said axis, and the width of said first trapezoidal bead may be varied within the range between the diameter of said first passage and the minimum diameter of said annular area.

19. The gasket of claim 9 wherein the extension of said first trapezoidal bead beyond said carrier plate defining means first surface may be varied.

20. The gasket of claim 9 wherein said first trapezoidal bead is formed in a plate member and wherein said means cooperating with said trapezoidal bead to limit cover plate bead deformation is a separate member affixed to said plate member.

* * * * *